Dec. 2, 1941.　　　O. LJUNGSTROM　　　2,264,444
VARIABLE SPEED TRANSMISSION
Filed Nov. 5, 1937　　　8 Sheets-Sheet 1

Fig. 1.

INVENTOR
O. Ljungstrom
BY Ralph B. Stewart
ATTORNEY

Dec. 2, 1941.  O. LJUNGSTROM  2,264,444
VARIABLE SPEED TRANSMISSION
Filed Nov. 5, 1937   8 Sheets-Sheet 3

Fig. 3.

INVENTOR
O. Ljungstrom
BY Ralph B. Stewart
ATTORNEY

Dec. 2, 1941.   O. LJUNGSTROM   2,264,444
VARIABLE SPEED TRANSMISSION
Filed Nov. 5, 1937   8 Sheets-Sheet 4

INVENTOR
O. Ljungstrom
BY Ralph B. Stewart
ATTORNEY

Patented Dec. 2, 1941

2,264,444

UNITED STATES PATENT OFFICE 2,264,444

VARIABLE SPEED TRANSMISSION

Olof Ljungstrom, Detroit, Mich.

Application November 5, 1937, Serial No. 173,027

17 Claims. (Cl. 74—472)

My invention relates to a variable speed transmission, and in particular to a transmission of the hydraulic type for producing a smooth and continuous change in the drive ratio.

An object of the invention is to devise a variable speed transmission suitable for use on motor vehicles and in which the drive ratio between the engine shaft and the driven shaft is automatically controlled to obtain best efficiency of the operation of the engine.

Another object is to devise a variable speed transmission in which the drive ratio is automatically varied to meet the torque requirements of the load.

A further object of my invention is to devise a variable speed transmission which may be embodied in the axle construction of a motor vehicle to provide not only a variable speed drive for the vehicle but also provide a differential drive for the vehicle wheels in turning curves.

Still another object is to devise a variable speed transmission which may be bolted directly to the engine and supported upon the vehicle frame with the engine so as to reduce the unsprung weight of the vehicle and thereby improve the riding quality of the car.

My invention involves the use of a variable displacement hydraulic pump, and another novel feature of my invention is embodied in a simplified construction of a servo-motor for varying the displacement of the pump.

Additional objects are to provide novel means for controlling the servo-motor; to provide novel means for interlocking the engine accelerator control and the transmission control; and to provide novel means for replenishing the fluid in the fluid transmission circuit.

A preferred embodiment of my invention is illustrated in the accompanying drawings in which.

Referring to the drawings, 1 indicates a main housing provided with a supporting flange 1a which is preferably bolted directly to the engine block or other suitable support carried by the frame of the car. A worm 2, preferably of the hourglass type, is journaled in the housing concentric with the flange 1a and is driven from the engine shaft by means of a flange coupling 3 adapted to be bolted to a corresponding flange coupling on the engine shaft. The worm 2 engages and drives a worm gear 4 which is journaled on an axis transversely of the axis of the worm. The worm 2 is also arranged to drive the rotor element 5 of a primary hydraulic unit which sometimes acts as a pump and at other times acts as a motor. The rotor 5 is preferably mounted upon a hollow shaft 5a which is journaled at one end by roller bearing 6a mounted in casing 1 and at the other end by roller bearing 6b mounted in an end plate 1b secured to casing 1 on the opposite side of the casing from flange 1a and forming one end wall of the primary pump housing. Worm 2 is preferably formed on a hollow shaft 2a which has a splined connection with a sleeve 5b on shaft 5a, and also has a splined connection with a shaft 2b mounted within the worm 2, the shaft 2b being journaled in casing 1 by a ball bearing 6c. The other end of shaft 2b is supported within shaft 5a by means of a sleeve 2c which is provided with a shoulder abutting the end of the shaft 2a, and a nut 2d threaded onto the reduced end of shaft 2b cooperates with the sleeve 2c in clamping the worm shaft 2d and the inner race of ball bearing 6c onto the shaft 2b.

A resilient coupling is provided between the driving flange 3 and the worm 2 to absorb vibrations, and this coupling consists of a sleeve 7 having a splined connection with the stub shaft 3a of flange 3 and also having a circular plate flange 7a mounted within a housing carried by the end of worm shaft 2b and formed of a radial flange 2e on the end of shaft 2b and a cooperating annular flange 2f secured to the flange 2e. The flange 7a is coupled to the housing formed of flanges 2e and 2f by resilient coupling devices comprising a series of short helical springs 7b located in recesses or holes formed in the flange 7a and extending into recesses formed in the flanges 2e and 2f, the arrangement being such that the driving torque is transmitted through the springs 7b. The sleeve 7 is journaled in a cover plate 1c mounted in the end of the flange 1a. It will be understood that any other form of vibration absorbing device may be employed if desired.

A cap or cover 1e is bolted to end plate 1b and encloses the roller bearing 6b. This cap is provided with a duct Da which communicates at one end with the fluid passage of the primary pump 5 and supplies lubricating fluid to the worm 2 by means of a hollow stem 1c' extending into a central opening in the end of worm shaft 2b. The shaft 2b is provided with suitable ducts for conducting lubricant to worm 2. A duct Db extends from the lower part of cap 1c through the plate 1b and returns excess oil or lubricant from cap 1c to the oil sump located in the bottom of casing 1.

The worm gear 4 is mounted between opposing ends of two sleeve elements 4a and 4a' which are journaled in axial alignment with each other by means of ball bearings 6d and 6d' mounted in sleeve extensions of housing plates 1d and 1d' respectively. Each of the sleeves 4a and 4a' is provided with internal gear teeth (4b and 4b') forming the ring gear of a differential gearing. Since the transmission is symmetrical on each side of the vertical central axis shown in Figure 1 of the drawings, the construction will be described for the right-hand side only, and it will be understood that the construction on the other side is identical, corresponding elements on the left side being identified by the same reference characters primed.

The outer face of the cover plate 1d is provided with a circular recess forming the casing for the rotor 8 of a secondary hydraulic unit. Rotor 8 is mounted upon a hollow shaft 8a which in turn is journaled at one end by ball bearings 6e and at the other end by ball bearings 6f mounted in the plate 1e bolted to plate 1d. The inner end of the shaft 8a is provided with gear teeth 8b forming the pinion gear of a differential gearing. A hollow shaft 9 is arranged within the shaft 8a and is provided with a circular flange 9a on the inner end thereof, which flange forms one ring of a spider for supporting the planet gears of the differential gearing. The other ring 10 of the spider is supported from the flange 9a by a series of arms 10a bolted to the flange 9a. Three planet gears 11a, 11b and 11c are journaled by needle bearings upon three hollow shafts 12a, 12b and 12c supported between the rings 9a and 10 forming the planet spider. The inner end of shaft 9 is maintained concentric with the inner end of shaft 8a by sleeve 9b. The outer end of shaft 9 is journaled in a ring-bearing 9c supported by radial arms from plate 1f bolted to the plate 1e, and the outer end of the shaft 9 has a splined connection with the sleeve 9d which is journaled in the cap member 1g by ball bearings 6g. The sleeve 9d is provided with a coupling flange 9e to which one of the traction wheels of the vehicle may be connected by any suitable connection. The sleeve 9d is maintained in position on the shaft 9 by means of a nut 9f threaded on the end of the shaft 9.

Figure 1:
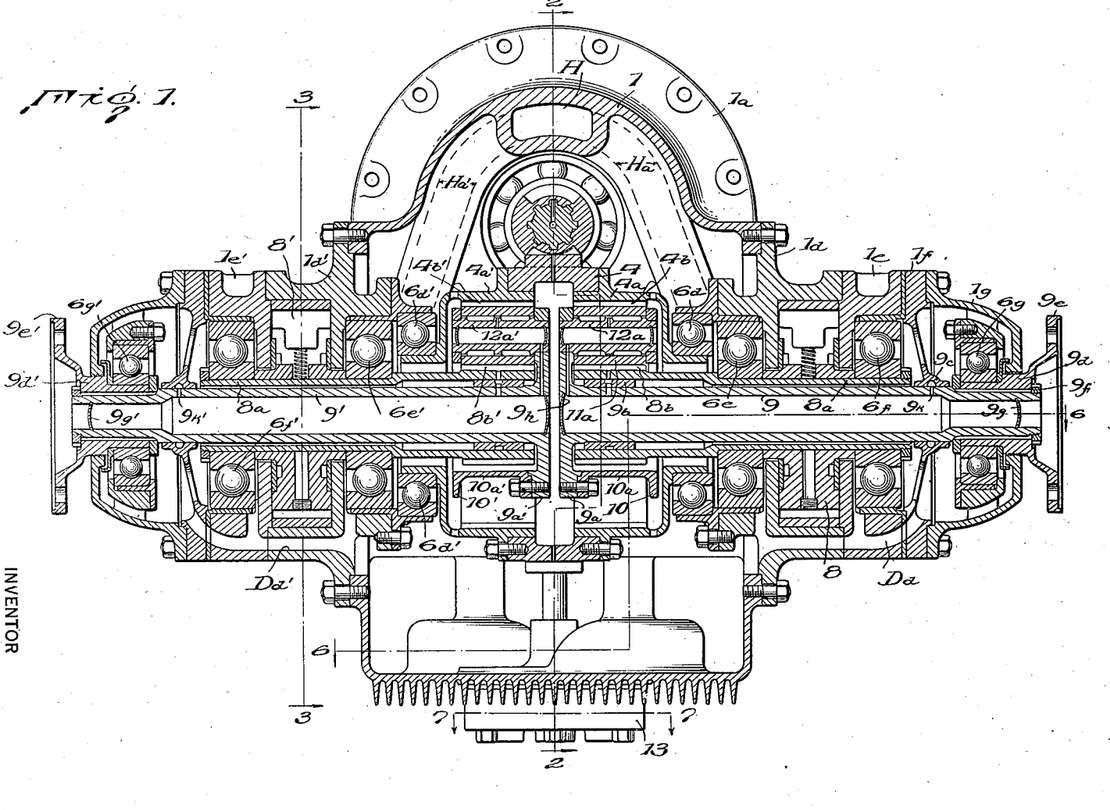
Figure 1 is a longitudinal sectional view of the transmission taken along the line 1—1 of Figure 2.
Figures 6, 7, 8, 9A, 9B, 9C:
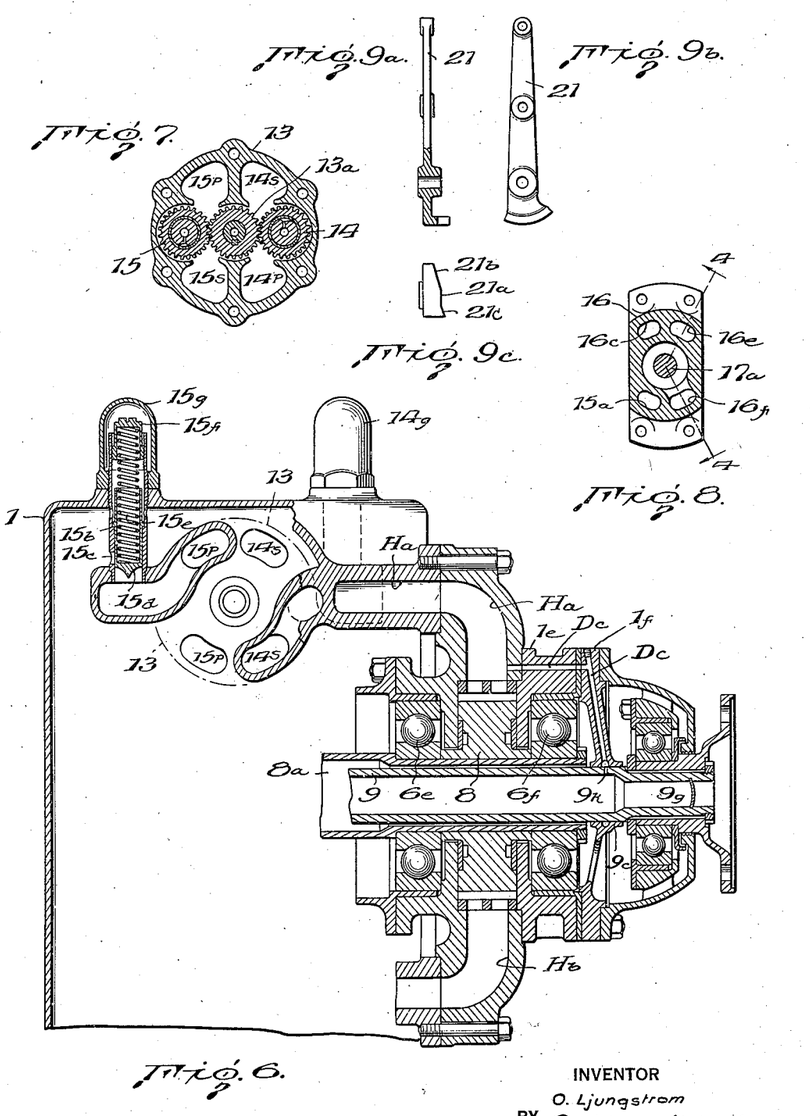
Figure 6 is a fragmentary sectional view taken along the cutting line 6—6 of Figure 1 showing a horizontal section through one of the secondary hydraulic units, and the details of one of the control valves.
Figure 7 is a sectional view taken along line 7—7 of Figure 1 showing the arrangement of two control pumps.
Figure 8 is a sectional view taken along line 8—8 of Figure 4 showing the arrangement of the control ducts.
Figures 9a, 9b and 9c are views illustrating the construction of the control lever.

As shown in Figure 6, the sleeve bearing 9c is provided with an oil groove on the inner face thereof, and lubricant for this bearing is supplied from the hydraulic circuit of pump 8 through a duct Dc which passes through the plate 1e and through one of the radial arms which supports the bearing 9c on the plate 1f. Any excess lubricant which collects in the cap 1g is returned to the oil sump in the bottom of the housing 1 through duct Dd, see Figure 1. Shaft 9 is closed at both ends by resilient discs 9g and 9h, and oil is admitted to the shaft through holes 9k communicating with the oil groove in bearing 9c, and oil is supplied from the shaft 9 to the gear 8b and to the interior of the hollow journal shafts 12a, 12b and 12c through suitable ducts as shown in Figure 1. Oil ducts are also provided in hollow journal shafts 12a, 12b and 12c for supplying lubricant to the needle bearings of the planet gears.

Figure 2:
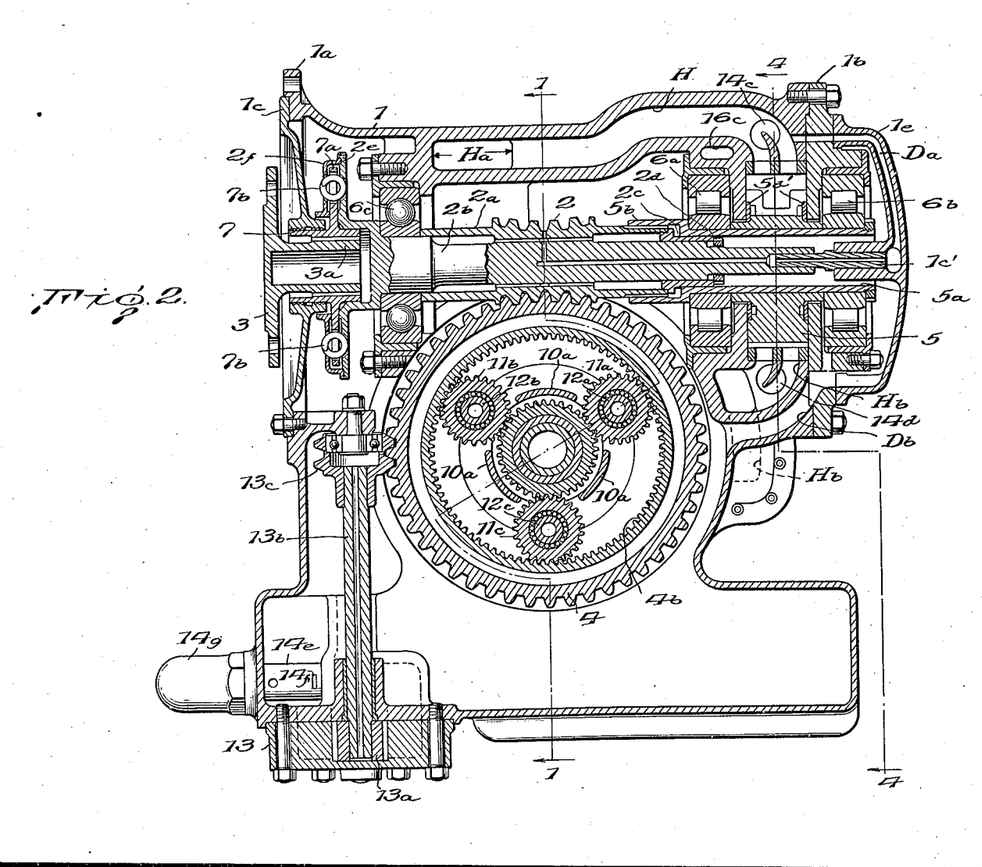
Figure 2 is a transverse sectional view taken along line 2—2 of Figure 1.
Figure 3:
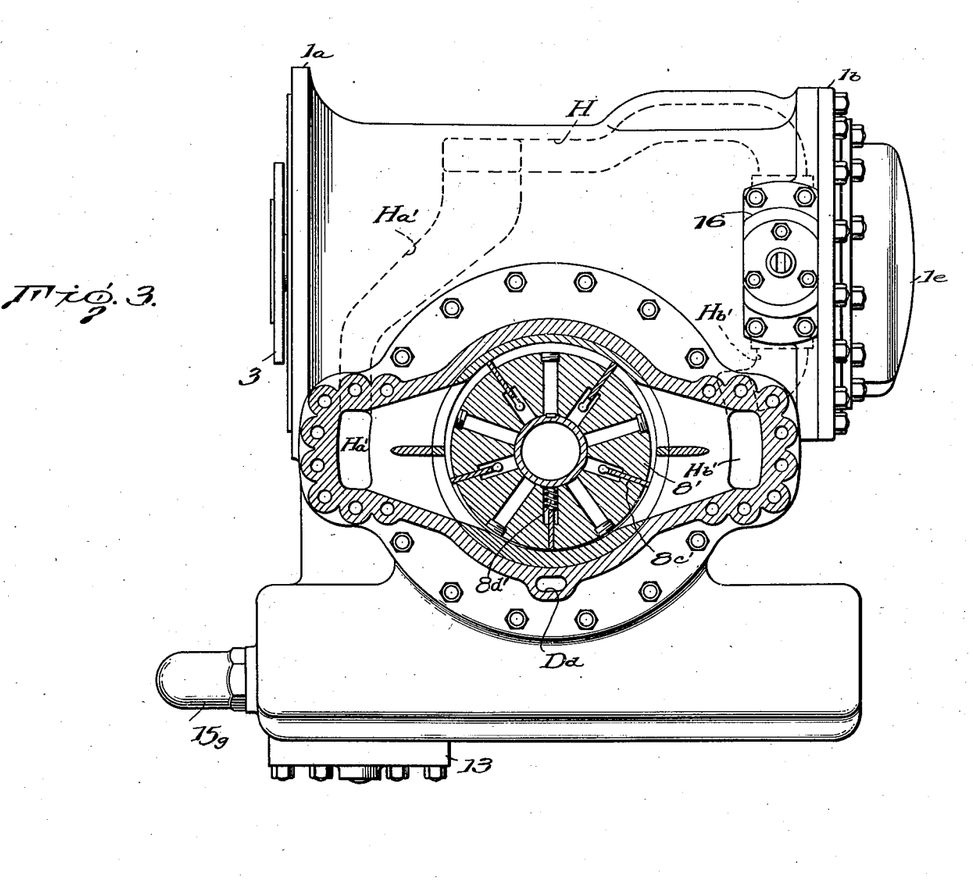
Figure 3 is a sectional view taken along line 3—3 of Figure 1 showing the arrangement of one of the secondary hydraulic units.
Figure 4:
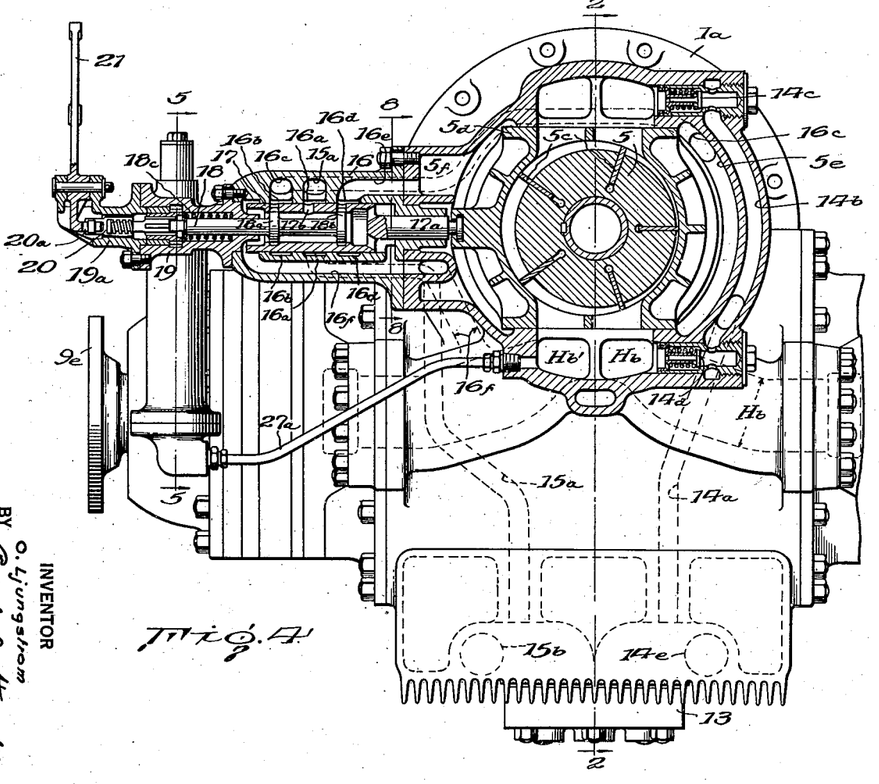
Figure 4 is a sectional view taken along line 4—4 of Figure 2 showing the arrangement of the primary hydraulic unit, the servo-motor and the control arrangement therefor.

The primary pump 5 is a variable displacement pump, and in the construction shown, the rotor 5 with the slidable vanes 5c are mounted for rotation in a circular recess formed in a sliding liner 5d, the liner being arranged for sliding movement so that the displacement of the pump may be varied from a maximum on one side of the pump axis as shown in Figure 4 to a maximum on the other side of the pump axis. In other words, by shifting the liner 5d from the position shown in Figure 4 to the right, the displacement of the pump can be varied from a maximum down to zero and to a maximum in the opposite direction, thus reversing the direction of flow of the fluid without reversing the direction of rotation. The sliding vanes 5c are held in position by suitable rings 5d' engaging shoulders formed on the ends of the vanes as shown in Figure 2, and these vanes may also be urged outwardly by suitable springs as shown in the construction illustrated in Figure 3 for the secondary pump 8'. The construction of the secondary pump units is substantially like that of the primary unit except that the displacement is not variable, and the construction is shown in Figure 3 where the rotor 8' is provided with sliding vanes 8c' which are urged outwardly by springs 8d'. Secondary pump 8 has the same construction as pump 8'.

The hydraulic circuit between the primary and the two secondary pump units includes a duct H which connects with the port formed in the upper part of the liner 5d and runs forward within the casing 1 towards flange 1a, and divides into two passages, the passage Ha extending to one side of the pump 8 and the passage Ha' extending to one side of the pump 8' located on the other side of the transmission. The fluid circuit for the pump unit 8 is completed by passage Hb extending from the opposite side of the rotor 8 back to the primary unit 5 and communicating with the port in the lower side of liner 5d. In a similar manner, the fluid circuit for pump unit 8' is completed by a duct Hb' extending from the opposite side of the rotor 8' back to the primary unit 5 and communicates with the port formed in the lower part of liner 5d. Thus both pump units 8 and 8' may be driven from the primary pump 5 or either secondary unit may drive the primary pump. Also, fluid from one secondary pump may circulate through the other secondary pump without passing through the primary pump.

Any loss of fluid from the fluid circuit connecting the various hydraulic units is replenished by means of a make-up pump driven from the worm gear 4 and operating to draw fluid from the sump in the base of the transmission and to introduce it in the low pressure side of the circuit. The make-up pump is embodied in a double pump construction which also supplies fluid to control and operate the displacement varying means of the primary pump 5. The make-up and control pumps are enclosed in a casing 13 secured to the bottom wall of the casing 1 below the sump, and the driving unit of both pumps comprises a gear 13a mounted on a shaft 13b driven from worm gear 4 by pinion 13c. The make-up pump comprises a gear 14 meshing with driven gear 13a. The suction side 14s of the make-up pump communicates with the sump and draws fluid therefrom, while the output side 14p of the pump supplies fluid through duct 14a to space 14b located in the casing 1 adjacent the rotor 5. From space 14b fluid is supplied to either side of the fluid circuit of pump 5 through spring pressed valves 14c and 14d, depending upon which side is the low pressure side of pump 5. The valves 14c and 14d are provided to prevent the flow of fluid from the high pressure side of the fluid circuit to the low pressure side, and also prevent back-flow into the make-up pump. The make-up pump is provided with a pressure regulating valve connected to its outlet side and consisting of a cylinder 14e communicating with the pump outlet and provided with a relief aperture 14f which is normally closed by means of a spring pressed piston located in the cylinder 14e. A screw for adjusting the pressure in the delivery side of the make-up pump is located within the removable cap 14g. The construction of the pressure regulating valve for the make-up pump is the same as for the valve of the control pump which is shown in detail in Figure 6 of the drawings.

The control pump for supplying fluid to the servo-motor for operating the liner 5d of the primary pump consists of a gear 15 meshing with the driven gear 13a. The inlet side 15s of the control pump communicates with the sump and draws fluid from the sump, while the outlet 15p of the pump supplies fluid through duct 15a to the control valve of the servo-motor. The control pump is provided with a pressure regulating valve which maintains a substantially constant pressure output of the pump consisting of a cylinder 15b communicating with the outlet of the pump and provided with a relief aperture 15c which is normally covered by a piston 15d which is biased to normal position by a spring 15e. The pressure of the spring 15e upon the piston 15d may be adjusted by screw 15f located on the outside of the casing 1 and provided with a cover cap 15g.

In varying the position of the liner 5d, I utilize the liner as a power piston in the servo-motor construction by introducing fluid under pressure to the space on one side or the other of the liner. The control valve for supplying fluid to the spaces on opposite sides of the liner is embodied in the housing or cylinder 16 bolted to the casing 1 and illustrated in section in Figure 4. The cutting plane for the section through the cylinder 16 in Figure 4 is shown by the line 4—4 in Figure 8. One element of the control valve consists of a sleeve 17 mounted in cylinder 16, the sleeve 17 being connected to and movable with the liner 5d by a stem 17a. The inner wall of the cylinder 16 is provided with a circular port 16a surrounding the sleeve 17 and is supplied with fluid from the control pump through duct 15a. Sleeve 17 is provided with an aperture 17b which communicates with the circular port 16a to admit fluid under pressure to the inside of the sleeve 17. Cylinder 16 is also provided with a circular port 16b surrounding the sleeve 17, and this port is connected by duct 16c to the space 5e located between the right-hand side of the liner 5d and its casing. The sleeve 17 is also provided with apertures which connect the circular port 16b with the interior of the sleeve. A third circular port 16d is provided in cylinder 16 and this port is connected by duct 16e with the space 5f located between the left side of liner 5d and its casing. The spaces at the ends of sleeve 17 within cylinder 16 are connected with the sump in housing 1 by duct 16f.

A valve rod 18 is arranged within the sleeve 17 and is provided with a disc valve 18a arranged so that its peripheral edge covers the apertures in sleeve 17 to cut off communication between the circular port 16b and the interior of the sleeve 17. A second disk valve element 18b is carried by the rod 18 and is arranged so its peripheral edge covers the apertures which connect the circular port 16d with the interior of the sleeve 17. The rod 18 is biased towards the left by means of spring 18c located in housing 19 secured to cylinder 16, but movement of the rod is limited by means of the member 20 having threaded engagement with the left end of the rod 18 and provided with a roller 20a engaging a cam surface on the end of control lever 21. The member 20 is mounted for reciprocating movement in cap 19a secured to housing member 19 and is provided with a splined connection therewith to prevent turning.

Figure 11:
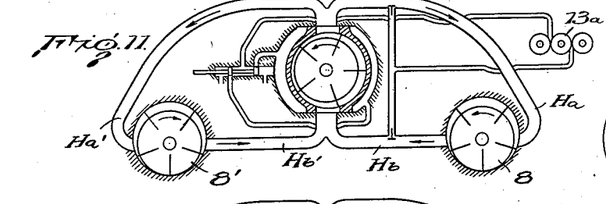
Figure 11A:
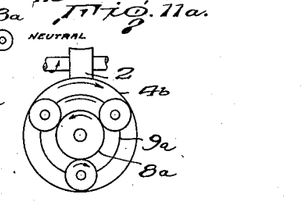

As shown in Figure 9c, the cam surface on the lower end of the control lever 21 is formed of three sections, the first section 21a corresponding to the neutral position of the transmission, the second section 21b corresponding to the position for forward operation, and the third section 21c corresponding to the position of the lever for reverse operation. When the lever 21 is in neutral position, the cam roller 20a rests against the cam section 21a and the liner 5d is held in such position that the output of pump 5 is sufficient to rotate secondary pumps 8 and 8' in the proper direction and at the proper speed to hold the driven shafts 9 and 9' stationary. This condition of operation is indicated diagrammatically in Figures 11 and 11a.

Figure 15:
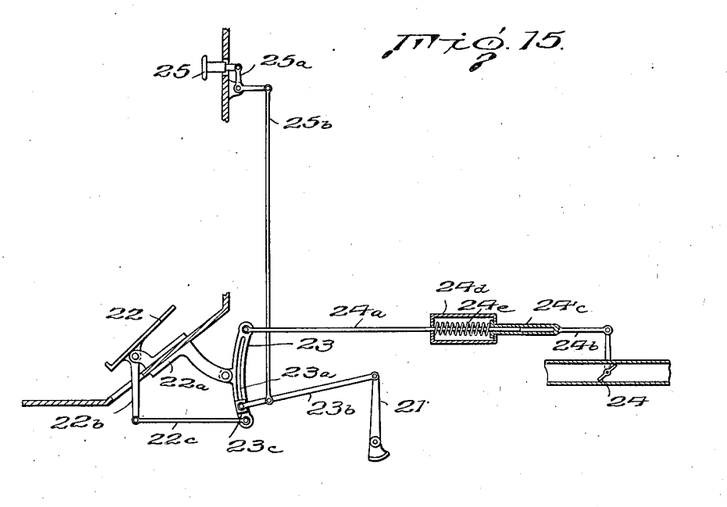
Figure 15 is a schematic view showing a preferred arrangement for controlling the transmission.

In Figure 15, I have illustrated a preferred arrangement for operating the control lever 21 from the accelerator pedal of the motor vehicle. In this arrangement, the accelerator pedal 22 is pivotally supported upon a bracket 22a mounted on the floor-boards of the vehicle, and the arm 22b of the pedal is connected by a link 22c to the lower end of lever 23 pivoted intermediate its ends to the bracket 22a. The lever 23 is provided with an arcuate slot 23a having its center of curvature located at the upper end of control lever 21, and the lever 21 is operated from the lever 23 by link 23b pivotally secured to the upper end of lever 21 and having pivotal connection with a sliding block 23c arranged in arcuate slot 23a. The engine throttle 24 is operated by means of a connection from the upper end of lever 23. This connection consists of two link parts 24a and 24b joined by a compressible section consisting of a cylinder 24c carried by link 24b and receiving the end of link 24a and also having telescopic engagement with a cylinder 24d carried by link 24a. A compression spring 24e is arranged within cylinder 24d and acts to normally hold the links 24a and 24b in extended position.

With the arrangement shown in Figure 15, when the accelerator pedal 22 is in idling position, the control lever 21 is maintained in neutral position, and depression of the pedal 22 will operate to open the engine throttle and to shift control lever 21 to the position for forward operation. For reverse operation, the link 23b must be shifted to a position adjacent the upper end of the lever 23, and, for this purpose a button 25 is provided on the dashboard of the vehicle, and by pulling this button out, the link 23b is shifted to the upper position through bell crank 25a and link 25b. In this position the lever 21 will be rotated in the opposite direction from the direction of operation for the position shown in Figure 15 when pedal 22 is depressed.

When it is desired to operate the transmission for forward drive, the control parts are as shown in Figure 15. Depression of accelerator pedal 22 moves the lever 21 so that the cam roller 20a begins to bear upon the inclined cam surface 21b, and at the same time the engine throttle being opened through the connection 24a—24b. As soon as the cam roller 20a starts down the cam surface 21b, the spring 18c moves the valve rod 18 to the left of the neutral position (see Fig. 4) whereby the valve disc 18a uncovers ports in sleeve 17 to admit fluid under pressure from the interior of sleeve 17 to circular port 16b, and from this port through duct 16c to the space 5e to the right of the liner 5d. At the same time, valve disc 18b uncovers ports in sleeve 17 to permit fluid to flow from the space 5f on the left of liner 5d through duct 16e, through the right end of sleeve 17, and through exhaust duct 16f back to the sump in casing 1. The pressure exerted in the space 5e against the liner 5d causes the liner to move to the left, and this movement causes the displacement of pump 5 to be decreased, as shown by the positions of the liner in Figures 11 and 12. Movement of the liner also causes movement of the sleeve 17 to the left to close the ports in the sleeve 17 by the valve discs 18a and 18b and thus maintain the liner in a definite position depending upon the position of the lever 21. It will be understood that the servo-motor construction causes the liner 5d to follow the movement of the valve rod 18 in either direction from neutral position.

Since the displacement of the pump 5 has been reduced from the displacement in the neutral position, the output of the secondary pumps 8 and 8′ becomes greater than the intake of the pump 5, so the pump 5 acts as a load on the secondary pumps and imposes a reaction on the floating elements of the two differential gears. This reaction causes a torque to be applied to the two drive shafts 9 and 9′, and the vehicle will be driven in a forward direction at a definite speed, depending upon the engine speed and the position of the control lever 21.

Figure 12:
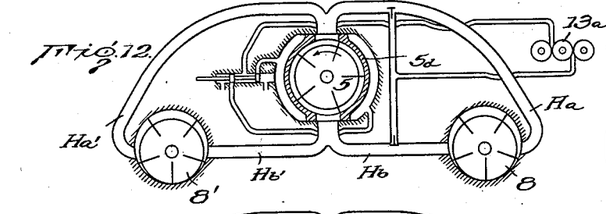
Figure 12A:
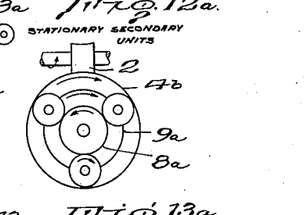

As the accelerator pedal 22 is further depressed, the lever 21 will cause the further shifting of the liner 5d until the liner becomes concentric with the rotor 5 and the output of the pump 5 becomes zero. In this position the two secondary pump units will be held in stationary position, and this condition of operation is indicated in Figures 12 and 12a.

Figure 13:
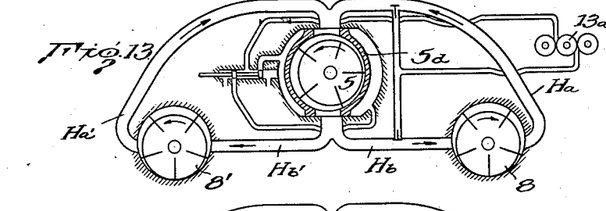
Figure 13A:
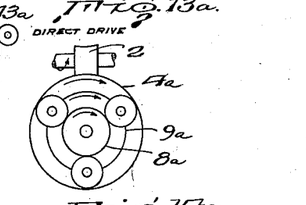

Further movement of the accelerator pedal causes the liner 5d to shift to the opposite side of the pump axis and reverses the direction of flow of fluid through pump 5, as shown in Figure 13. Under this condition of operation, the pump 5 acts as a pump to supply fluid under pressure for driving the secondary pump units in the opposite direction of rotation, and, as shown in Figure 13a, under this condition of operation all elements of the differential gears rotate in the same direction. When the speed of rotation of the secondary rotors becomes equal to the speed of rotation of the worm gear 4, a condition of direct drive is obtained, that is, the drive ratio is the ratio between worm 2 and worm gear 4.

Figure 14:
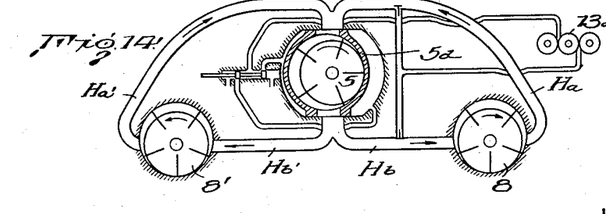
Figure 14A:
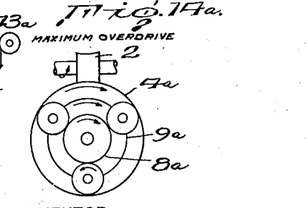

Further depression of pedal 22 causes shifting of the liner to the left until a maximum displacement of the pump 5 is obtained as shown in Figure 14, thus increasing the speed of rotation of sun gear 8b in the direction shown in Figure 14a, and maximum forward drive is obtained.

From the foregoing it will be seen that as the accelerator pedal is moved from idling position to fully operated position during forward operation, the secondary pumps 8 and 8′ first supply fluid under pressure to the primary pump, tending to drive the primary pump in the same direction of rotation and adding a certain amount of torque to the engine torque applied to the worm gear 4. As the vehicle accelerates, the speed of rotation of the secondary pumps decreases until they come to a stop and then the primary pump begins to drive the secondary pumps in the opposite direction of rotation, thereby adding their speed of rotation to the speed of the worm gear 4 in driving the driven shafts 9 and 9′. It will thus be seen that during the first stage of acceleration the secondary pumps drive the primary pump as a motor, and during the later stage of acceleration, the function of the hydraulic unit is reversed and the primary pump drives the secondary pumps as motors in the opposite direction of rotation.

Figure 10:
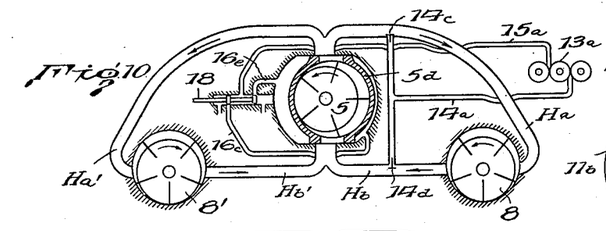
Figures 10, 11, 12, 13 and 14 are schematic views showing the hydraulic circuit arrangement for different conditions of operation.
Figure 10A:
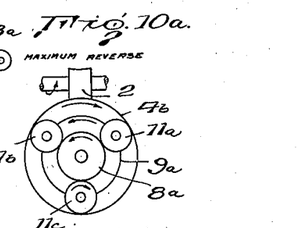
Figures 10a, 11a, 12a, 13a and 14a illustrate the direction of rotation of the various elements of the differential gearing for the conditions of operation represented by Figures 10 to 14 respectively.

For reverse operation, the button 25 on the dashboard is pulled out, thereby shifting the link 23b from the lower position on lever 23 to the upper position. Depression of the accelerator pedal 22 will, under this condition, open the throttle to the engine and operate the lever 21 in reverse direction from that for forward operation and cause movement of the pump liner 5a to the right from the neutral position, as shown in Figure 10. This movement increases the displacement of the primary pump which acts to drive the rotors of the secondary pumps at increased speed in the directions indicated in Figure 10a and at a greater speed than the speed of the ring gears of the differentials, thus causing movement of the vehicle in reverse direction.

The cam surface on the lever 21 may be so designed that the engine throttle becomes substantially fully open before the lever is moved beyond the neutral section 21a of the cam surface, and further movement of the control lever is made possible by the provision of the compressible link consisting of the elements 24c, 24d, and 24e in the connection to the engine throttle. It will be understood, however, that the arrangement may be such that the neutral cam section 21a is of small extent and the engine throttle is gradually opened as the control lever is moved to either side of the neutral position into the forward or reverse sections 21b and 21c.

Figure 5:
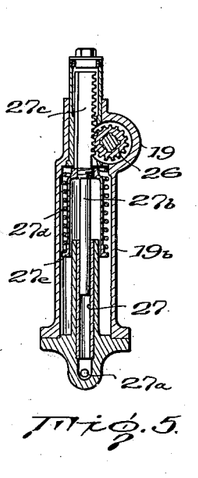
Figure 5 is a sectional view taken along line 5—5 of Figure 4 showing the details of the pressure responsive element for controlling the displacement of the primary pump.

The transmission may be operated as described above without any automatic control, but I prefer to provide automatic control of the transmission ratio in accordance with the load demands, and for this purpose, I provide means for controlling the position of the valve rod 18 in accordance with the pressure developed in the main hydraulic circuit. One form of automatic control arrangement is shown in Figures 4 and 5, and includes a pinion 26 mounted in casing 19 and having splined engagement with valve rod 18. Mounted within the casing 19b and supported on housing 19 is a fluid cylinder 27 which is supplied with fluid under pressure from the main hydraulic circuit through pipe 27a. The pipe 27a should connect to the high pressure side of pump 5 for forward operation. A piston 27b is arranged in the cylinder 27 and carries a rack 27c which engages the pinion 26. The piston 27b and the rack 27c are normally biased to the lower position by means of a spring 27d surrounding a sleeve 27e secured to piston 27b.

So long as the pressure in the main hydraulic circuit does not exceed a value sufficient to overcome spring 27d, the piston 27b remains in its lowermost position, and the transmission is controlled entirely by the movement of the lever 21. Should the pressure in the hydraulic circuit increase above the value necessary to overcome the force of the spring 27d, the piston 27b will rise until the force of the spring equals the fluid pressure, and in rising the rack 27c will rotate the pinion 26 on the valve rod 18, and will thereby cause the valve rod to rotate in such direction that the threaded end thereof is partially unscrewed from the member 20, which results in a movement of the valve rod 18 to the right as viewed in Figure 4. This movement of the valve rod is in such direction that it will bring about a change in the displacement of pump 5 which will cause a reduction in the pressure developed in the main hydraulic circuit. It will thus be seen that the action of the automatic control is to prevent excessive pressures from being developed in the hydraulic circuit and to prevent a too rapid change in the drive ratio.

The automatic control is effective at any stage of forward operation. It normally tends to increase the ratio between the speed of the propeller shaft and the speed of the driven shafts 9 and 9', but whenever the vehicle meets with increased resistance, such as results from ascending a hill, the increased pressure in the fluid circuit operates through the automatic control to decrease the ratio between the speed of the propeller shaft and the speed of the driven shafts, thus increasing the driving torque to accommodate the increased load. Also, in accelerating the vehicle from standstill, if the accelerator pedal is depressed quickly to its fully operated position, the pressure developed in the fluid circuit may be sufficient to operate the piston 27b to its uppermost position, and, as the vehicle accelerates and the fluid pressure decreases, the drive ratio will be automatically increased.

Figure 16:
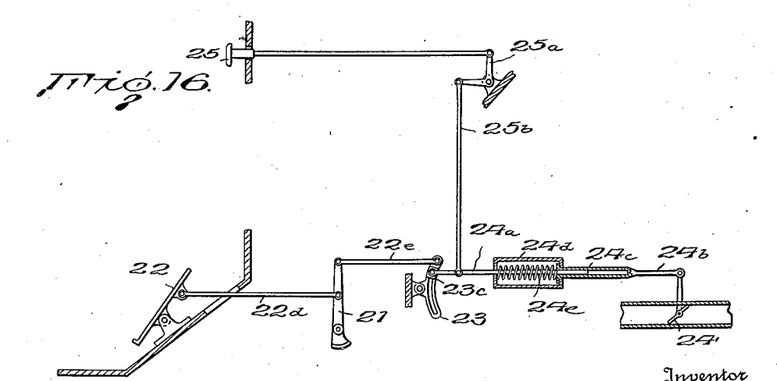
Figure 16 is a schematic view showing a modified control arrangement.
Figure 17:
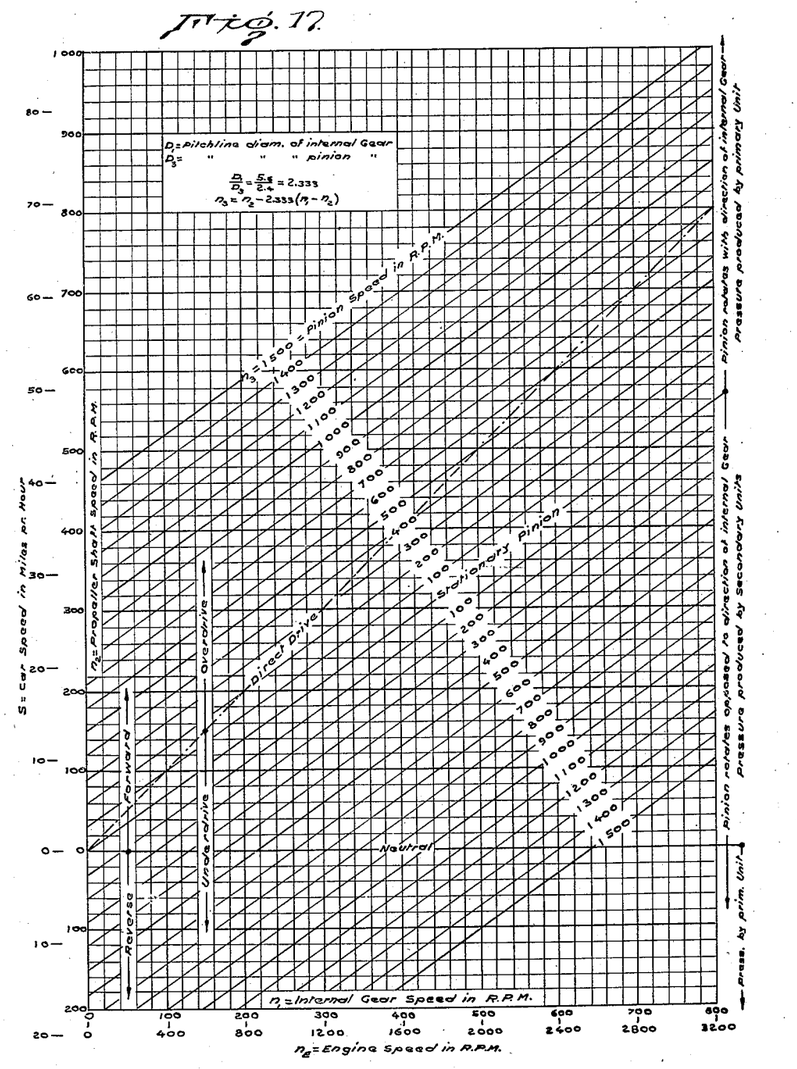
Figure 17 is a graph illustrating the relation between the speeds of different elements in the transmission system for different car speeds and for different engine speeds.

In Figure 16, I have shown a modified arrangement for controlling the transmission from the accelerator pedal. This arrangement differs from Figure 15 in that the lever 21 is controlled directly from the pedal 22 by link 22d, and the lever 23 with the arcuate slot is controlled from the lever 21 by link 22e. The throttle 24 is controlled by a connection extending from the sliding block 23c in lever 23 including link parts 24a and 24b with a compressible section 24c—24d—24e, as described in connection with Figure 15. The button 25 is arranged to shift the link 24a from its normal upper position to the lower position through bell crank 25a and link 25b. In the forward running position as shown in Figure 16, depression of the pedal 22 causes shifting of the lever 21 for forward operation and also opens the engine throttle. For reverse operation, the pedal 22 is depressed at the heel portion, thereby causing lever 21 to move in the opposite direction, and, in order to have this movement open the engine throttle, it is necessary to first pull out the button 25 to shift the connection 24a to the bottom end of the lever 23. I prefer the arrangement illustrated in Figure 15, since by adjusting the button 25 so the sliding block 23c is adjacent the pivot point of the lever 23, it is possible to control the engine without movement of the transmission control lever 21.

As applied to a motor vehicle in the manner shown in Figures 15 and 16, my invention provides a variable speed transmission which is controlled entirely from the accelerator pedal of the vehicle, and the usual change speed gear and clutch elements are dispensed with. Also, my variable speed transmission embodies a differential drive which permits the two driven shafts to rotate at different speeds when the vehicle is passing around a curve. This is made possible by reason of the fact that the transmission fluid may circulate between the two secondary pumps without passing through the primary pump.

The threaded engagement between the end of valve rod 18 and the member 20, and the cooperation between the cam surface on the lower end of lever 21 with the sliding member 20 constitutes an adjustable stop for limiting the movement of the valve rod 18 under the action of biasing spring 18c, and this stop is under the separate and joint control of the lever 18 and the pressure existing in the fluid circuit of the primary pump through the action of piston 27b driving the pinion 26. Also, the threaded engagement between the end of valve rod 18 and the stop element 20 constitutes an expandible connection which is normally held in retracted position by the spring 27d, but is expanded under the action of the fluid pressure in the main hydraulic circuit.

Where the transmission is bolted directly to the engine or to the motor vehicle frame, it will be understood that the shafts 9 and 9' will be connected to the traction wheels of the vehicle by means of universal joints and short driven shafts to permit movement of the vehicle frame with respect to the traction wheels. In this manner the unsprung weight of the vehicle is reduced to a minimum.

The term "convertible pump" as employed herein denotes a pump which will operate either as a fluid pump or as a fluid motor. The term "reversible displacement" denotes that the displacement may be changed to reverse the direction of flow of fluid during pump operation without reversing the direction of rotation, or, for motor operation, to reverse the direction of rotation without reversing the flow in the fluid circuit.

I have herein described the principle of my invention and illustrated a preferred embodiment thereof. Certain modifications have been pointed out to indicate the broad scope of the invention. Various other modifications will occur to those skilled in the art, and I desire it to be understood that all modifications which fall within the terms of the appended claims are to be considered as falling within the scope of my invention.

What I claim is:

1. A variable speed transmission system comprising a pair of differential gear sets, a common drive shaft for driving one element of each differential gear set, a pair of driven shafts connected respectively to a second element of said differential gear sets, a pair of convertible hydraulic pumps connected respectively to the third element of said differential gear sets, and a variable displacement hydraulic pump driven by said drive shaft and connected in parallel fluid circuit relation with said pair of convertible hydraulic pumps.

2. A variable speed transmission system comprising a pair of differential gear sets, a common drive shaft for driving one element of each differential gear set, a pair of driven shafts connected respectively to a second element of said differential gear sets, and variable speed driving connections between said drive shaft and the third element of each differential gear set, said driving connections being interconnected thereby said driven shafts are driven in differential speed relation.

3. A transmission comprising a pair of differential gear sets, a pair of driven shafts connected respectively to one element of said gear sets, a drive shaft arranged to drive a second element of each of said gear sets, a pair of fluid pumps driven respectively by the third element of said gear sets, said fluid pumps being connected in series fluid circuit relation whereby said driven shafts are connected in differential speed relation.

4. A variable speed transmission comprising, a pair of differential gear sets, a pair of driven shafts connected respectively to one element of said gear sets, a drive shaft arranged to drive a second element of each of said gear sets, a pair of secondary fluid pumps driven respectively by the third element of said gear sets, said fluid pumps being connected in series fluid circuit relation whereby said driven shafts are connected in differential speed relation, a primary fluid pump driven by said drive shaft and connected in parallel fluid circuit relation with said secondary pumps, and means for varying and reversing the displacement of said primary pump whereby to drive said pair of pumps in either direction and at variable speeds.

5. A transmission comprising a housing, a pair of driven shafts journaled in said housing in axial alignment, a pair of differential gear sets mounted in said housing, said driven shafts being connected respectively to the planet spiders of said gear sets, a drive shaft journaled in said housing and arranged to drive the ring gear of each of said gear sets, the sun gears of said gear sets being provided with hollow shaft extensions arranged respectively around said driven shafts, a pair of secondary fluid pumps having rotors mounted respectively upon said hollow shafts, said fluid pumps being connected in series fluid circuit relation whereby said driven shafts are connected in differential speed relation, a primary fluid pump driven by said drive shaft and connected in parallel fluid circuit relation with said secondary pumps, and means for varying and reversing the displacement of said primary pump whereby to drive said secondary pumps in either direction.

6. A variable speed transmission system comprising a pair of differential gear sets, a common drive shaft for driving one element of each differential gear set, a pair of driven shafts connected respectively to a second element of said differential gears sets, a pair of convertible hydraulic pumps connected respectively to the third element of said differential gear sets, a third convertible hydraulic pump driven by said drive shaft and connected in parallel fluid circuit relation with said pair of convertible hydraulic pumps, a make-up pump, ducts for supplying fluid from said make-up pump to said fluid circuit on both sides of said third hydraulic pump, and check valves arranged in said ducts for preventing fluid from flowing from the high pressure to the low pressure side of said circuit while permitting fluid to flow from said make-up pump to the low pressure side of said circuit.

7. In a transmission system, the combination of a drive shaft, a fluid pump driven by said drive shaft, a driven shaft, a second fluid pump mechanically connected to said driven shaft and connected in fluid circuit with said first pump, a make-up pump, supply ducts for supplying fluid from said make-up pump to said fluid circuit on both sides of said first pump, and check valves arranged in said supply ducts for preventing fluid from flowing from the high pressure side of said fluid circuit back into said make-up pump.

8. A power transmission system comprising a drive shaft, a driven shaft, a fluid pump driven by said drive shaft, a second fluid pump, a fluid circuit connecting said pumps, means interconnecting said pumps whereby during one stage of operation one side of said circuit is at high pressure and during another stage of operation the other side of said circuit is at high pressure, a make-up pump and ducts for supplying fluid to both sides of said fluid circuit from said make-up pump, and check valves arranged in said supply ducts for preventing fluid from flowing from the high pressure side to the low pressure side of said circuit while permitting fluid to flow from said make-up pump to the low pressure side of said circuit.

9. A variable speed transmission comprising, a pair of differential gear sets, a pair of driven shafts connected respectively to one element of said gear sets, a drive shaft arranged to drive a second element of each of said gear sets, a pair of secondary fluid pumps driven respectively by the third element of said gear sets, said fluid pumps being connected in series fluid circuit relation whereby said driven shafts are connected in differential speed relation, a primary fluid pump driven by said drive shaft and connected in parallel fluid circuit relation with said secondary pumps, means for varying the displacement of said primary pump to drive said secondary pumps in a given direction, and means responsive to the fluid pressure in said fluid circuit for controlling said displacement varying means.

10. A variable speed transmission comprising, a pair of differential gear sets, a pair of driven shafts connected respectively to one element of said gear sets, a drive shaft arranged to drive a second element of each of said gear sets, a pair of secondary fluid pumps driven respectively by the third element of said gear sets, said fluid pumps being connected in series fluid circuit relation whereby said driven shafts are connected in differential speed relation, a primary fluid pump driven by said drive shaft and connected in parallel fluid circuit relation with said secondary pumps, said primary pump comprising a casing, a rotor mounted therein and a slidable liner surrounding said rotor for varying the displacement of said pump, a source of fluid under pressure, ducts for supplying fluid from said source to the spaces within said casing on opposite sides of said liner, a valve for controlling said ducts comprising two cooperating movable parts, one of said valve parts being arranged to supply fluid to the space on one side of said liner when moved in one direction and to supply fluid to the space on the other side of the liner when moved in the opposite direction, and the said second movable part of said valve being connected to and movable with said liner and arranged to cut off the supply of fluid when said liner reaches a predetermined position with respect to the first movable valve part, biasing means tending to move the first valve part in a direction to increase the pump displacement, a stop for limiting the movement of said first valve part by said biasing means, and means responsive to increase in the outlet pressure developed by said pump for shifting said stop in a direction to decrease the pump displacement.

11. A variable speed transmission comprising, a pair of differential gear sets, a pair of driven shafts connected respectively to one element of said gear sets, a drive shaft arranged to drive a second element of each of said gear sets, a pair of secondary fluid pumps driven respectively by the third element of said gear sets, said fluid pumps being connected in series fluid circuit relation whereby said driven shafts are connected in differential speed relation, a primary fluid pump driven by said drive shaft and connected in parallel fluid circuit relation with said secondary pumps, means for varying and reversing the displacement of said primary pump whereby to drive said pair of pumps in either direction and at variable speed, an engine for driving said drive shaft, an accelerator for varying the speed of said engine, means for normally maintaining said displacement varying means in a position to prevent the transmission of power to said driven shafts, and a connection for operating said displacement varying means from said accelerator.

12. A variable speed transmission comprising, a pair of differential gear sets, a pair of driven shafts connected respectively to one element of said gear sets, a drive shaft arranged to drive a second element of each of said gear sets, a pair of secondary fluid pumps driven respectively by the third element of said gear sets, said fluid pumps being connected in series fluid circuit relation whereby said driven shafts are connected in differential speed relation, a primary fluid pump driven by said drive shaft and connected in parallel fluid circuit relation with said secondary pumps, means for varying and reversing the displacement of said primary pump whereby to drive said pair of pumps in either direction and at variable speed, an engine for driving said drive shaft, an accelerator for varying the speed of said engine, means for normally maintaining said displacement varying means in a position to prevent the transmission of power to said driven shafts, and a connection for operating said displacement varying means in one direction upon movement of said accelerator from idling position, said connection including means for at will reversing the direction of operation of said displacement varying means when said accelerator is moved from idling position.

13. A variable speed transmission comprising, a pair of differential gear sets, a pair of driven shafts connected respectively to one element of said gear sets, a drive shaft arranged to drive a second element of each of said gear sets, a pair of secondary fluid pumps driven respectively by the third element of said gear sets, said fluid pumps being connected in series fluid circuit relation whereby said driven shafts are connected in differential speed relation, a primary fluid pump driven by said drive shaft and connected in parallel fluid circuit relation with said secondary pumps, means for varying and reversing the displacement of said primary pump whereby to drive said pair of pumps in either direction and at variable speed, an engine for driving said drive shaft, an accelerator for varying the speed of said engine, means for normally maintaining said displacement varying means in a position to prevent the transmission of power to said driven shafts, a connection for operating said displacement varying means from said accelerator, and means responsive to pressure variations in the fluid circuit of said primary pump for modifying the control of said displacement varying means by said accelerator.

14. A variable speed transmission system comprising an engine having a drive shaft, an accelerator for varying the speed of said engine, a driven shaft, a variable ratio transmission means connecting said driven shaft with said drive shaft, means for normally maintaining the control element of said transmission means in a position to prevent the transmission of power to said driven shaft, and means controlled by operation of said accelerator beyond fully open position for controlling said transmission means to initially apply power to said driven shaft and to increase the ratio of drive shaft speed to engine speed as the accelerator is moved beyond fully open position.

15. A variable speed transmission system comprising an engine having a drive shaft, an accelerator for varying the speed of said engine, a driven shaft, a variable ratio transmission means connecting said driven shaft with said drive shaft, means for normally maintaining the control element of said transmission means in a position to prevent the transmission of power to said driven shaft, and means controlled by operation of said accelerator beyond fully open position for controlling said transmission means to apply power to said driven shaft, and means responsive to the load on said driven shaft for modifying the control of said transmission means.

16. A variable speed transmission system comprising an engine having a drive shaft, an accelerator for varying the speed of said engine, a driven shaft, a variable ratio transmission means connecting said driven shaft with said drive shaft, said transmission means including a control element movable in one direction for forward operation and in the opposite direction for reverse operation, means for normally maintaining the control element in neutral position, a connection for operating said control element in one direction by movement of said accelerator from idling position towards accelerating position, said connection including means for at will reversing the direction of operation of said control element when said accelerator is moved from idling position in the same direction.

17. A variable speed transmission system comprising, a pair of differential gear sets, a pair of driven shafts connected respectively to one element of said gear sets, a drive shaft arranged to drive a second element of each of said gear sets, a pair of secondary fluid pumps driven respectively by the third element of said gear sets, said fluid pumps being connected in series fluid circuit relation whereby said driven shafts are connected in differential speed relation, a primary fluid pump driven by said drive shaft and connected in parallel fluid circuit relation with said secondary pumps, said primary pump comprising a casing, a rotor mounted therein and a slidable liner surrounding said rotor for varying the displacement of said pump, a source of fluid under pressure, ducts for supplying fluid from said source to the spaces within said casing on opposite sides of said liner, a valve for controlling said ducts comprising two cooperating movable parts, one of said valve parts being arranged to supply fluid to the space on one side of said liner when moved in one direction and to supply fluid to the space on the other side of the liner when moved in the opposite direction, and the said second movable part of said valve being connected to and movable with said liner and arranged to cut off the supply of fluid when said liner reaches a predetermined position with respect to the first movable valve part, said valve part being movable in one direction from neutral position for forward operation and in the opposite direction from neutral position for reverse operation, means for normally maintaining said first valve part in neutral position, an engine for driving said drive shaft and provided with an accelerator, a connection for operating said first valve part in the direction for forward operation by movement of said accelerator from idling position in one direction, said connection including means for at will reversing the direction of operation of said first valve part when said accelerator is moved from idling position in the same direction, and means responsive to increase in pressure in the fluid circuit of said primary pump for modifying the control of said first valve part by said accelerator.

OLOF LJUNGSTROM.